United States Patent [19]
Utsumi

[11] Patent Number: 6,137,766
[45] Date of Patent: Oct. 24, 2000

[54] MULTI-LAYER DISC REPRODUCING APPARATUS AND METHOD

[75] Inventor: Yoshimasa Utsumi, Tokyo, Japan

[73] Assignee: Sony Corporation, Tokyo, Japan

[21] Appl. No.: 09/283,186

[22] Filed: Apr. 1, 1999

[30]      Foreign Application Priority Data

Apr. 9, 1998 [JP] Japan .................................. 10-097514

[51] Int. Cl.[7] ...................................................... G11B 7/24
[52] U.S. Cl. ......................................... 369/275.1; 369/94
[58] Field of Search .................................. 369/275.1, 94, 369/32, 281, 286, 280, 284, 275.3

[56]                References Cited

U.S. PATENT DOCUMENTS

| | | | |
|---|---|---|---|
| 5,696,743 | 12/1997 | Kawasaki ................................... | 369/32 |
| 5,706,269 | 1/1998 | Ogura et al. . | |
| 5,781,516 | 7/1998 | Yamada ..................................... | 369/32 |
| 5,881,032 | 3/1999 | Ito et al. .................................... | 369/32 |
| 5,920,527 | 7/1999 | Aoki ......................................... | 369/32 |
| 6,014,364 | 1/2000 | Takasu et al. ........................ | 369/275.1 |

FOREIGN PATENT DOCUMENTS

| | | |
|---|---|---|
| 0292942 | 11/1988 | European Pat. Off. . |
| 0817195 | 1/1998 | European Pat. Off. . |

*Primary Examiner*—Tan Dinh
*Attorney, Agent, or Firm*—Jay H. Maioli

[57]                ABSTRACT

An apparatus for reproducing a multi-layer disc which has a first layer containing a recorded multi-bit digital signal quantized at a first sampling frequency and a second, layer containing a recorded 1-bit digital signal quantized at a second, higher sampling frequency. The apparatus includes a layer switching device capable of executing an instruction to selectively switch the signal reproduction of the first layer and that of the second layer; and a reproduction controller for preferentially setting the signal reproduction from either the first or second layer when the multi-layer disc is loaded in the apparatus, and in response to a manipulation of the layer switching device, selectively switching the setting of the signal reproduction relative to the first and second layers. A display is also incorporated to discriminably indicate thereon the layer selected by a manipulation of the layer switching device, hence enabling the user to recognize the layer being currently reproduced.

4 Claims, 4 Drawing Sheets

MULTI-LAYER DISC REPRODUCING APPARATUS AND METHOD

BACKGROUND OF THE INVENTION

The present invention relates to an apparatus and a method for reproducing a multi-layer disc which has, for example, a first layer containing a recorded audio signal of a first quality and a second layer containing a recorded audio signal of a second quality higher than the first quality.

There is currently proposed a novel type of optical disc termed DVD (Digital Versatile Disc) greater in capacity than the known compact disc (hereinafter referred to as CD).

On a DVD which is an optical disc of 12 cm in diameter, information is recorded at a track pitch of 0.8 $\mu$m narrower than an ordinary track pitch of 1.6 $\mu$m employed on the conventional CD, and the wavelength of a semiconductor laser is changed from 780 nm on the CD to 630 nm, and the EFM (Eight-to-Fourteen Modulation) adopted for the CD is improved to consequently realize high-density recording which corresponds to information of approximately 4G bytes on one side of the disc.

Relative to such DVD, a multi-layer structure having two recording layers is lately proposed.

As disclosed, for example, in U.S. Pat. No. 5,706,263 filed on Mar. 26, 1997, the present applicant proposed a high-quality digital audio disc having a multi-layer structure where a 16-bit digital audio signal sampled at a frequency of 44.1 kHz is recorded in one layer, while a 1-bit quantized digital audio signal is recorded in another layer after being processed through $\Sigma\Delta$ modulation at a very high sampling frequency of 2.842 MHz which is 16 times the above frequency of 44.1 kHz.

The contents of signals to be recorded in such individual two layers are mutually the same (e.g., same music piece). Therefore, data of the same contents are recorded as normal-quality data of a CD level in one layer while being recorded as higher-quality data in the other layer.

Since such a multi-layer disc has one layer containing a recorded 16-bit digital audio signal sampled at 44.1 kHz, it is reproducible by any of ordinary compact disc players available currently in the general market.

Further in any apparatus adapted for reproduction of both layers, signals are reproducible properly from the two layers, so that any of a multiplicity of compact discs diffused widely now can be reproduced and still the novel multi-layer disc mentioned above can be reproduced as well.

Any of compact discs available in general and the novel multi-layer disc are substantially the same in external appearance. And in one of the layers of the multi-layer disc, data is recorded in conformity with the format of a compact disc so as to maintain down-compatibility therewith, i.e., digital audio signal processed through sampling at 44.1 kHz, 16-bit quantization and EFM is recorded.

For the purpose of explanatory convenience in the following description, one layer containing recorded data of the CD format will be referred to as a CD layer, and another layer containing recorded 1-bit digital audio signal processed at a sampling frequency of 2.842 MHz through $\Sigma\Delta$ modulation will be referred to as an HD (High-Definition) layer.

In reproduction of such a multi-layer disc having both a CD layer and an HD layer, it is necessary in a reproducing apparatus to execute a discrimination between the layers for reproduction and to perform various control actions.

In order to meet the above requirement, if identifiers relative respectively to the two layers are preset in a TOC (table of content) formed as a management area, a discrimination between the layers may be rendered possible with facility. However, in case such identifiers are newly recorded, compatibility between a conventional compact disc and a CD layer of a novel multi-layer disc may fail to be attained with a resultant possibility of inconvenience in use, so that additional recording of such identifiers is not desirable.

Furthermore, there exists a problem that the user cannot recognize which of a compact disc and a multi-layer disc is loaded in the apparatus unless the user is conscious of the disc type when loading the same.

In addition, another problem is also existent in the point that, since the recorded content of a CD layer and that of an HD layer are mutually the same (e.g., music piece or the like as a program), it is difficult to judge, by mere listening to the reproduced sound, which of the layers is being currently reproduced.

SUMMARY OF THE INVENTION

It is therefore an object of the present invention to provide improvements which enable a user to reproduce a desired layer of a multi-layer disc certainly without any inconvenience in regard to the above compatibility and further to achieve satisfactory recognition of the layer being currently reproduced.

According to an aspect of the present invention, there is provided a multi-layer disc reproducing apparatus adapted to reproduce a disc which has a first layer containing a recorded multi-bit digital signal quantized at a first sampling frequency and a second layer containing a recorded 1-bit digital signal quantized at a second sampling frequency higher sufficiently than the first sampling frequency. The apparatus includes a layer switching device capable of executing an instruction to selectively switch the signal reproduction of the first layer and that of the second layer; and a reproduction controller for preferentially setting the signal reproduction from either the first or second layer when the multi-layer disc is loaded in the reproducing apparatus, and in response to a manipulation of the layer switching device, selectively switching the setting of the signal reproduction relative to the first and second layers.

More specifically, one layer is selected and reproduced in an initial state of the apparatus for a multi-layer disc, and still reproduction of the other layer can be performed in compliance with the user's preference or other reason or situation.

Preferably, a display may be incorporated to discriminably indicate the layer selected by a manipulation of the layer switching device, hence enabling the user to recognize the layer being currently reproduced.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the multi-disc reproducing apparatus according to the present invention will be described in detail in the following order.

(1) Structure of multi-layer disc (2) Configuration of reproducing apparatus (3) External appearance of reproducing apparatus (4) Reproduction (Operation example 1; Operation example 2)

(1) Structure of Multi-Layer Disc

Figure 1:
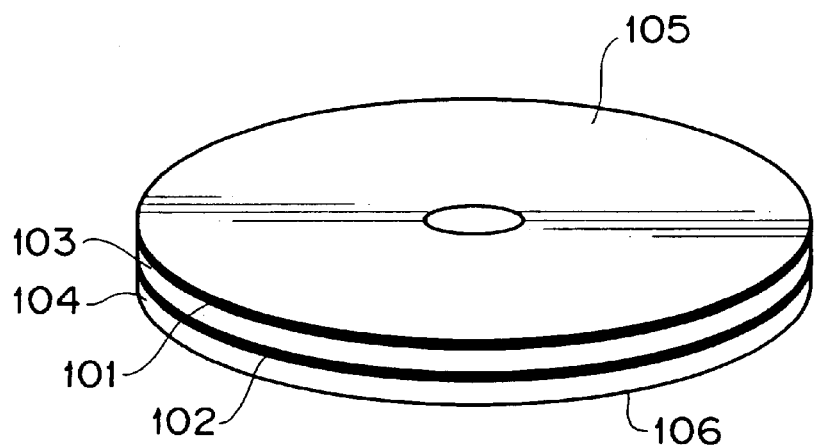
FIG. 1 is an explanatory diagram showing the structure of a multi-layer disc adapted for use in an embodiment which represents the reproducing apparatus of the present invention.

FIG. 1 shows an exemplary structure of a multi-layer disc adapted for use in an embodiment representing the reproducing apparatus of the invention.

This multi-layer disc is an optical one having a diameter of about 12 cm and a thickness of 1.2 mm. As illustrated, its layer structure consists of a label plane 105 on the upper side, a CD layer 101, a CD substrate 103, an HD layer 102, an HD substrate 104, and a read plane 106 on the lower side.

As it can be seen in this structure, there are formed two recording layers, i.e., a CD layer 101 and an HD layer 102. One recording layer (CD layer 101) contains a 16-bit digital audio signal sampled at a frequency of 44.1 kHz, as known in an ordinary CD. Meanwhile, the other recording layer (HD layer 102) contains a 1-bit digital audio signal processed through $\Sigma\Delta$ modulation at a very high sampling frequency of 2.842 MHz which is 16 times the foregoing frequency of 44.1 kHz.

A frequency band of 5 to 20 kHz is attained in the CD layer 101, while a wide frequency band of DC component to 100 kHz can be realized in the HD layer 102. A dynamic range of 98 dB is attained in the CD layer 101 over the entire audio band, while that of 120 dB can be realized in the HD layer 102 over the entire audio band.

In the CD layer 101, a minimum pit length is 0.83 $\mu$m; while in the HD layer 102, a minimum pit length is 0.4 $\mu$m.

A track pitch of 1.6 $\mu$m is set in the CD layer 101, while that of 0.74 $\mu$m is set in the HD layer 102.

As for a read laser wavelength, it is set to 780 nm in the CD layer 101, while it is shortened to 650 nm in the HD layer 102.

Further, the numerical aperture (NA) of an optical pickup lens is set to 0.45 for the CD layer 101, while it is set to 0.6 for the HD layer 102.

Thus, due to such changes of the minimum pit length, the track pitch, the numerical aperture NA of the lens and the laser wavelength, the data capacity of the HD layer 102 can be increased to 4.7 GB which is much greater than the data capacity (780 MB) of the CD layer 101, whereby a greater amount of data is rendered recordable.

(2) Configuration of Reproducing Apparatus

Figure 2:
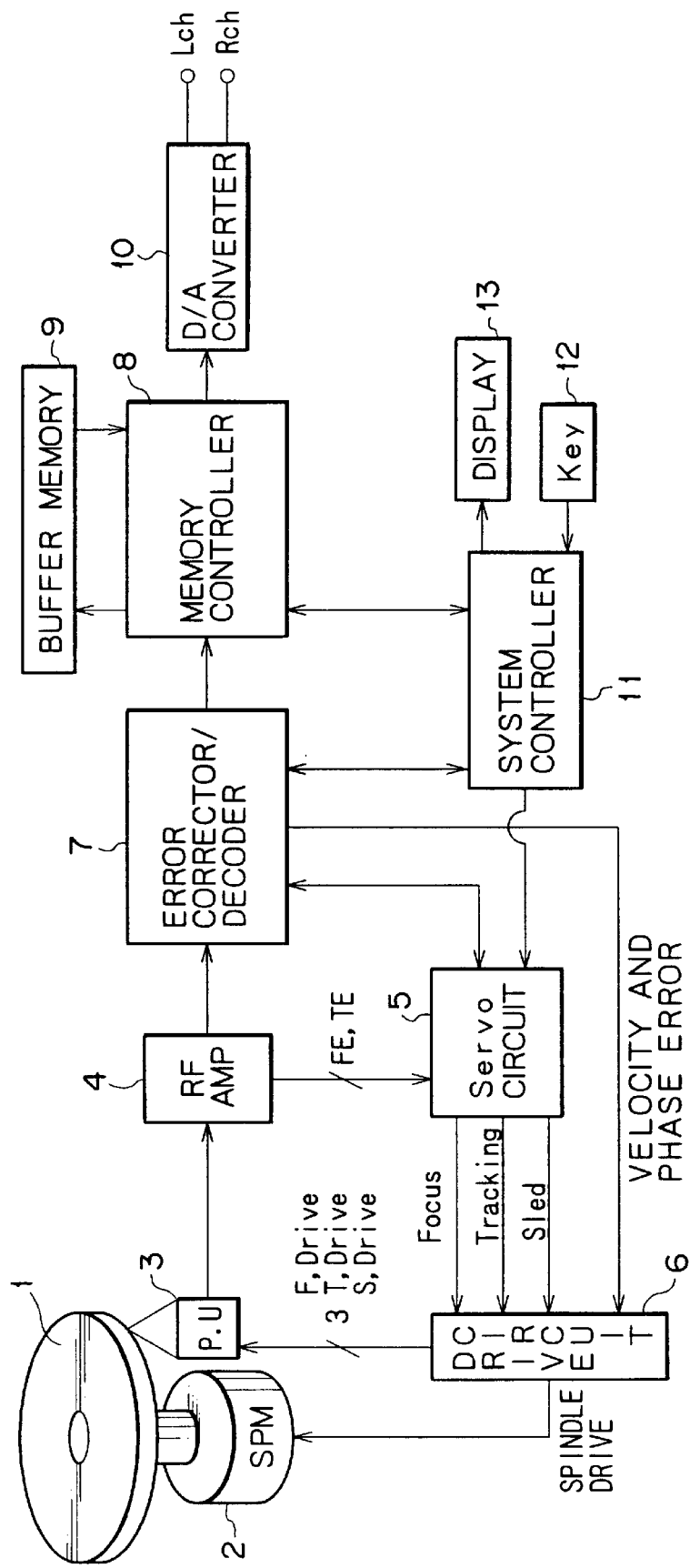
FIG. 2 is a block diagram of the disc reproducing apparatus in the embodiment.

FIG. 2 is a block diagram of the disc reproducing apparatus in this embodiment.

An optical disc 1 is either the above-described multi-layer disc or a known compact disc.

This optical disc 1 is placed on an unshown turntable and is rotated under control by a spindle motor 2 at a constant linear velocity (CLV).

An optical head 3 includes unshown components including objective lenses, a biaxial mechanism, semiconductor lasers, and a light sensor which receives the light emitted from the semiconductor laser and reflected by the surface of the optical disc 1.

In case the optical disc placed on the turntable is a multi-layer disc, the optical path is selectively switched so that a semiconductor laser emitting an output wavelength of 780 nm is used for reproducing the CD layer 101 of the disc, and another semiconductor laser emitting a shorter output wavelength of 680 nm is used for reproducing the HD layer 102.

The optical head 3 is equipped with two objective lenses. And the optical path is selectively switched so that one lens having a numerical aperture of 0.45 is used for reproducing the CD layer 101, and another lens having a numerical aperture of 0.6 is used for reproducing the HD layer 102.

In case the loaded optical disc 1 is a compact disc, the ordinary operation for reproducing the CD layer 101 of the multi-layer disc is performed.

If a hologram-integrated aspherical lens is used, it becomes possible to eliminate the necessity of employing two objective lenses inside the optical head 3 as mentioned, and merely a single lens is sufficient to meet the requirement with selective switching of the optical path of the semiconductor laser. Therefore, such an optical head may be used as well.

The biaxial mechanism includes a focus coil for driving the objective lens toward or away from the optical disc 1, and a tracking coil for driving the objective lens in the radial direction of the optical disc 1.

This reproducing apparatus is equipped with a sled motor (not shown) for widely moving the whole optical head 3 in the radial direction of the optical disc 1.

The reflected light detected by the light sensor inside the optical head 3 is supplied to an RF amplifier 4, which then executes a current-to-voltage conversion and a matrix calculation to generate a focus error signal FE, a tracking error signal TE, and also an RF signal as reproduced information.

The focus error signal FE and the tracking error signal TE thus generated are applied to the above-mentioned focus coil and the tracking coil, respectively, via a drive circuit 6 after phase compensation and gain control in a servo circuit 5.

Further the tracking error signal TE is processed via an LPF (low pass filter) in the servo circuit 5, wherein a sled error signal is generated and then is applied via the drive circuit 6 to the sled motor.

If the loaded optical disc 1 is a CD, the RF signal generated in the RF amplifier 4 is binary-coded with execution of EFD (eight-to-fourteen demodulation) and is processed for error correction through CIRC (cross interleave Reed-Solomon coding) in an error corrector/decoder 7, and subsequently the processed signal is supplied to a memory controller 8.

Meanwhile, if the loaded optical disc 1 on the turntable is a multi-layer disc, reproduction of its CD layer 101 is performed in the same manner as in the foregoing case of a CD, i.e., the signal is binary-coded with execution of EFD and is processed for error correction through CIRC in the error corrector/decoder 7, and then the processed signal is supplied to the memory controller 8.

In reproducing the HD layer 102 of the multi-layer disc, the signal is binary coded with execution of EFD-plus (eight-to-fourteen demodulation plus) in the error corrector/decoder 7, and is further processed for error correction on the basis of product code.

In the error corrector/decoder 7, the binary EFD or EFD-plus signal is compared with a reference clock to consequently generate a velocity error signal and a phase error signal, which are then supplied to the drive circuit 6 to control the rotation of the optical disc 1 by the spindle motor 2.

Further in the error corrector/decoder 7, the pull-in action of a PLL (phase-locked loop) is controlled in accordance with the binary EFD or EFD-plus signal.

The binary data after the error correction is written in a buffer memory 9 at a predetermined transfer rate via the memory controller 8.

When more than a predetermined amount of the data has been stored in the buffer memory 9, the data is read out therefrom at a second transfer rate which is sufficiently lower than the write transfer rate.

In this manner, the data is once stored in the buffer memory 9 and then is outputted therefrom as audio data so that, despite occurrence of a trouble where the optical head 3 fails to read the data continuously due to a track jump caused by some shock or other disturbance for example, it is still possible to realize a continuous audio data output properly, since the data, corresponding to the time required for resetting the optical head 3 to the former address prior to the track jump, has already been stored previously in the buffer memory 9.

The operation of the memory controller 8 is under control of a system controller 11.

The digital data read out from the buffer memory 9 by the memory controller 8 is converted by a D-A converter 10 into analog audio signals, which are then delivered as a right channel output and a left channel output.

In response to manipulations of keys provided in a key set 12, the system controller 11 performs various control actions of transferring a servo command to the relevant servo circuit 5, giving an instruction to the memory controller 8 for controlling the buffer memory 9, controlling a display unit 13 to display thereon a play lapse time and character information such as a title of the program being reproduced, or controlling the spindle servo and the decoder executed in the error corrector/decoder 7.

(3) External Appearance of Reproducing Apparatus

Figure 3:
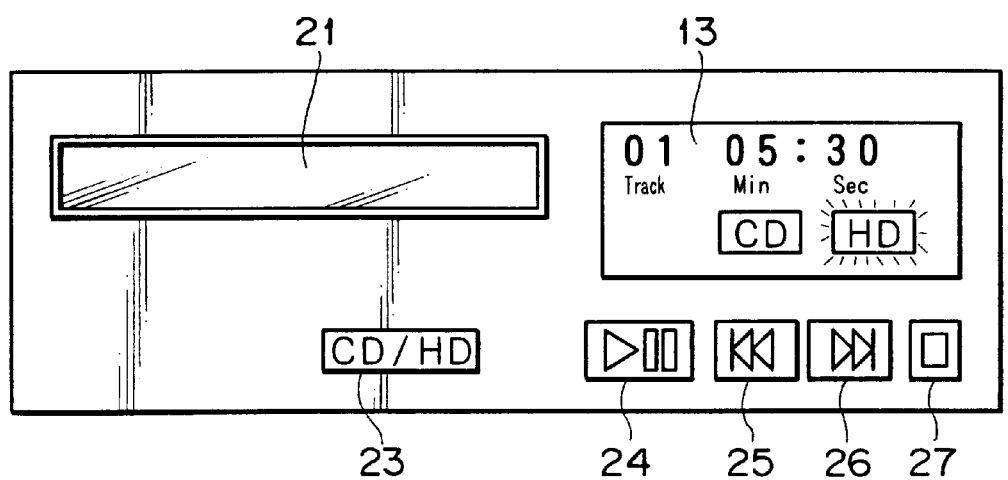
FIG. 3 is an explanatory diagram illustrating the front panel of the disc reproducing apparatus in the embodiment.

FIG. 3 illustrates the external appearance (front panel) of the reproducing apparatus in this embodiment.

An optical disc 1 is placed on a tray 21 and is inserted into the reproducing apparatus.

On a display unit 13, there are displayed a track number, time for playing a piece of music or the like being reproduced, and an indication representing either a CD layer 101 (or CD) or an HD layer 102 being currently reproduced.

Manipulation keys constituting the aforementioned key set 12 are provided as illustrated.

A CD/HD key 23 is manipulated for selecting the desired layer to be reproduced in case a multi-layer disc is loaded.

In a first operation example performed in this embodiment as will be described later, the CD layer is reproduced preferentially in consideration of the fact that a multiplicity of conventional CDs have already been diffused in general.

At the time of initially turning on the reproducing apparatus, various conditions including the servo switching for the focus depth to be applied, switching of the wavelength and the optical path of the semiconductor laser, the decoding mode of the error corrector/decoder 7 and so forth are preset in the entire servo circuit 5 and error corrector/decoder 7 by the system controller 11 in conformity with the CD standards.

Due to such presetting, fast reproduction is rendered possible when a conventional compact disc is loaded.

In this case, if a multi-layer disc is loaded in the reproducing apparatus, the CD layer 101 thereof is first reproduced preferentially. However, when it is desired to reproduce the HD layer 102, the user manipulates the CD/HD key 23 to select reproduction of the desired layer.

More specifically, the CD/HD key 23 serves as a manipulator to carry out a toggle-like instruction in such a manner that its first pressing causes a transition from the CD layer 101 to the HD later 102, and its next pressing causes a transition from the HD layer 102 to the CD layer 101.

In a modification, the indication of a CD or HD element in a display unit 22 may be selectively turned on or blinked in response to a manipulation of the CD/HD key 23.

FIG. 3 illustrates an exemplary case where the element "HD" blinks to indicate selection of the HD layer 102.

In a second operation example performed in this embodiment as will be described later, the HD layer 102 of a multi-layer disc based on the novel format is reproduced preferentially.

This operation example corresponds to a case where, if a user has purchased a new multi-layer disc reproducing apparatus, it may be considered that the purpose resides in enjoying reproduction of the HD layer 102 of a multi-layer disc and therefore the HD layer 102 is used preferentially in most cases.

In this case, at the time of initially turning on the reproducing apparatus, various conditions including the servo switching for the focus depth to be applied, switching of the wavelength and the optical path of the semiconductor laser, the decoding mode of the error corrector/decoder 7 and so forth are preset in the entire servo circuit 5 and error corrector/decoder 7 by the system controller 11 in conformity with the standards of the HD layer 102.

In the state mentioned above, the time required until start of reproduction is rendered somewhat longer in case a conventional compact disc is loaded.

Meanwhile, if a multi-layer disc is loaded in the reproducing apparatus, the HD layer 102 is first reproduced preferentially. Therefore, when it is desired to select and reproduce the CD layer 101, the user manipulates the CD/HD key 23 to select the desired layer. Similarly to the foregoing case, the CD/HD key 23 serves as a toggle-like switching manipulator.

As shown in FIG. 3, the reproducing apparatus further has other manipulation members including a play/pause key 24, AMS (auto music sensor) keys 25 and 26 for selecting a desired program, and a stop key 27.

(4) Reproduction

Operation Example 1; Operation Example 2

Figure 4:
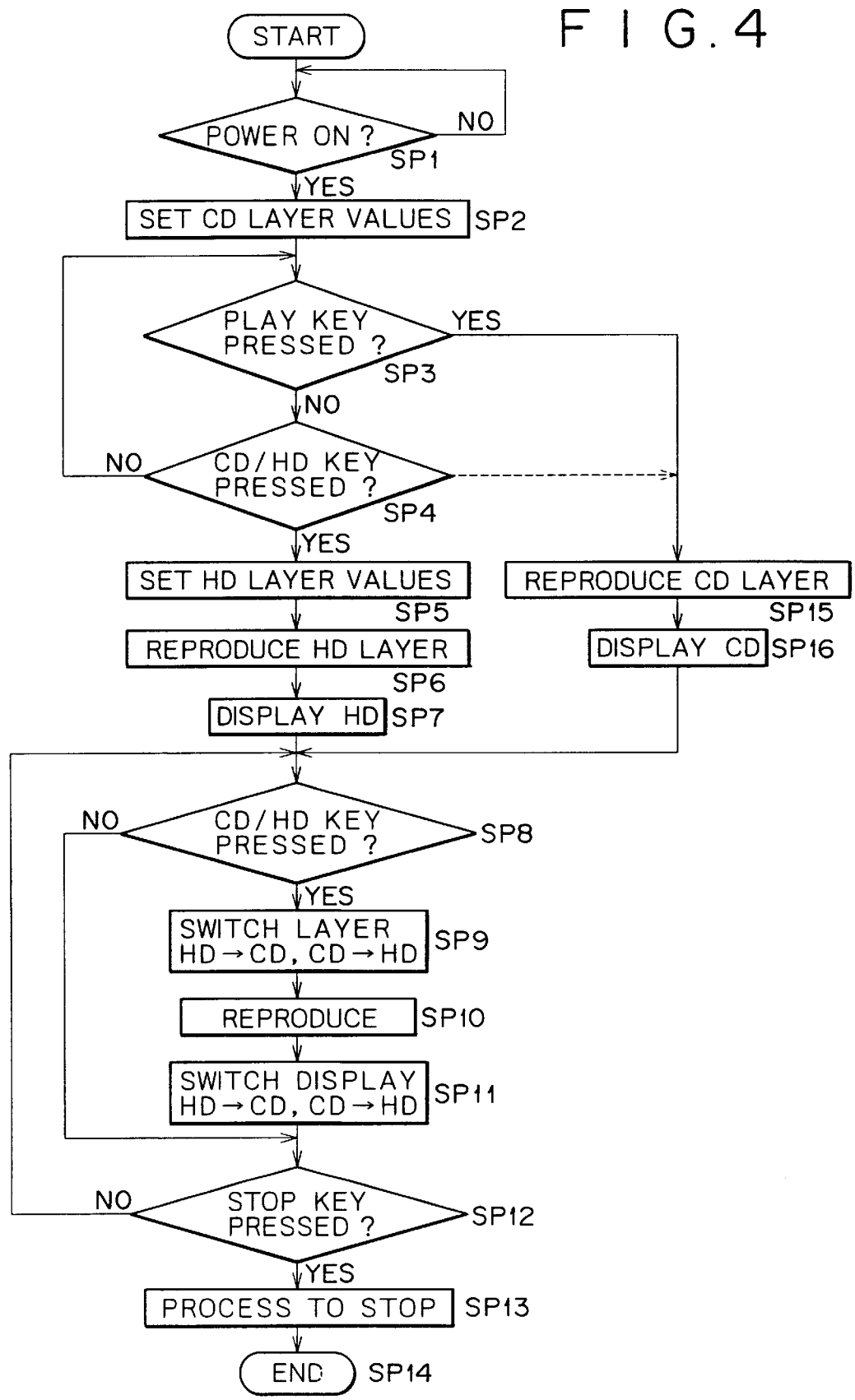
FIG. 4 is a flowchart of a first operation example executed in the embodiment.

FIG. 4 is a flowchart showing a processing routine as a first operation example performed in the reproducing apparatus of this embodiment. The routine in this flowchart is executed under control of the system controller 11.

The system controller 11 makes a decision at step SP1 as to whether the reproducing apparatus has been turned on or not. If the result of this decision is negative, the operation waits until the power supply is switched on.

Meanwhile, if the result of the decision at step SP1 is affirmative to signify that the apparatus is in its on-state, default values relative to the CD layer 101 are set as initial values in the system controller 11.

Then at step SP3, a decision is made as to whether the play key 24 has been pressed or not. If the result of this decision signifies no pressing of the play key 24, a decision is made at step SP4 as to whether the CD/HD layer select key 23 has been pressed or not.

If the result of the decision at step SP4 is affirmative to signify pressing of the CD/HD layer select key 23, default values relative to the HD layer 102 are set at step SP5 as initial values in the system controller 11.

In this case, a state with no pressing of the play key 24 and pressing of the CD/HD layer select key 23 is judged to be a demand for reproduction of the HD layer 102, and the system controller 11 enables execution of reproducing the HD layer at step SP6 and further indicates "HD" (turns on or blinks the HD element) in the display unit 13 at step SP7.

Subsequently at step SP8, a decision is made again as to whether the CD/HD layer select key 23 has been pressed or not during the reproduction.

And if the result of this decision signifies no pressing of the CD/HD layer select key 23 during the reproduction, the HD layer 102 is continuously reproduced at step SP12 until detection of a manipulation of the stop key 27 (or until completion of the reproduction).

Meanwhile, in case the result of the decision at step SP8 signifies pressing of the CD/HD layer select key 23 during reproduction of the HD layer 102, the operation proceeds to step SP9 to control the layer switching. Thereafter, the selected layer begins to be reproduced at step SP10, and the indication on the display unit is also switched at step SP11. That is, since the CD layer 101 is to be reproduced in this case, "CD" is indicated (by turning on or blinking the CD element) in the display unit 13.

Subsequently, a decision is made at step SP12 as to whether the stop key 27 has been manipulated or not. And if the result of this decision signifies no manipulation of the stop key 27, the operation returns to step SP8 again, where a decision is made as to whether the CD/HD layer select key 23 has been pressed or not during the reproduction.

In case the result of this decision signifies that the CD/HD layer select key 23 has been pressed again, the layer to be reproduced is switched again through the processes at steps SP9 to SP11, and the indication on the display unit is also switched.

Meanwhile, if the result of the decision at step SP12 signifies manipulation of the stop key 27 during reproduction of the HD layer 102 or that of the CD layer 101 (or if the result signifies completion of reproducing the relevant layer), a process of stopping the reproduction is executed at step SP13, and then the entire operation is terminated at step SP14.

In case the result of the decision at step SP3 signifies pressing of the play key 24, the CD layer 101 (or CD) begins to be reproduced at step SP15 while the initial values (corresponding to CD) set at step SP2 are kept unchanged. And "CD" is indicated on the display unit at step SP16.

Thereafter the operation proceeds to step SP8 and so forth, where reproduction of the CD layer 101 is performed, and the layer to be reproduced and the indication are switched in response to pressing of the CD/HD layer select key 23.

It should be noted that in this flowchart, pressing of the play key 24 or the CD/HD layer select key 23 is triggered by a start of reproduction, however, the processing routine may be so modified as to start reproduction in response to insertion of the disc 1 even if none of such keys is manipulated.

In this case, as represented by a broken line in FIG. 4, the operation proceeds to step SP15 if the result of the decision at step SP4 is negative, and then the CD layer 101 is reproduced preferentially with "CD" indicated on the display unit 13 at step SP16.

According to the first operation example mentioned above, initial setting is so executed that, when a multi-layer disc is loaded, first its CD layer 101 is reproduced preferentially. Therefore, even in case a CD is loaded, fast reproduction of the CD can be performed properly.

And when it is desired to switch the layer as in the case of reproducing the HD layer, the desired layer can be selected if the user presses the CD/HD layer select key 23 to switch the layer.

Thus, the first operation example is suitable principally for any user having a multiplicity of CDs.

Figure 5:
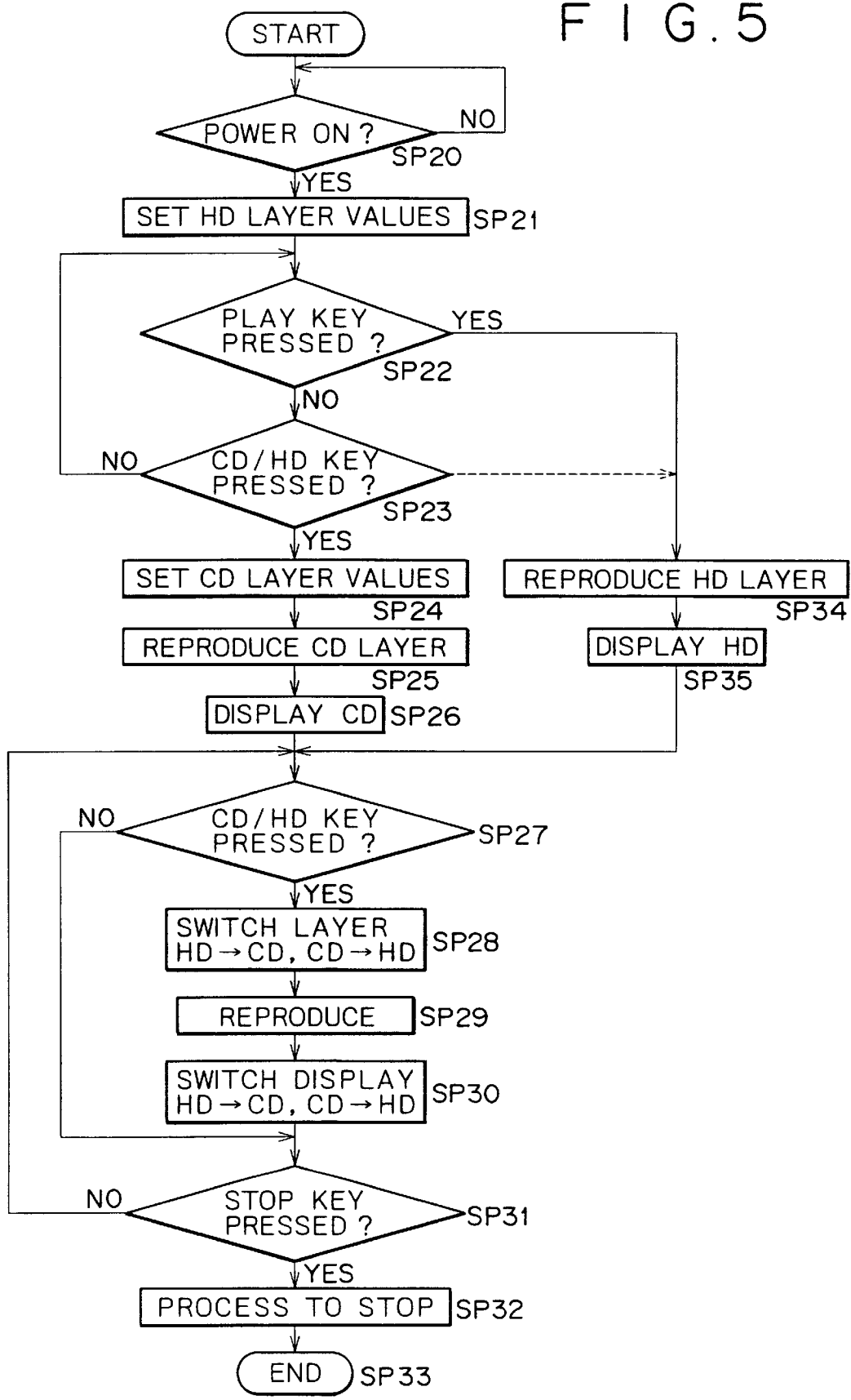
FIG. 5 is a flowchart of a second operation example executed in the embodiment.

Now a second operation example executed in this embodiment will be described below with reference to FIG. 5.

The system controller 11 makes a decision at step SP20 as to whether the reproducing apparatus has been turned on or not. If the result of this decision is negative, the operation waits until the power supply is switched on.

Meanwhile, if the result of the decision at step SP20 is affirmative to signify that the apparatus is in its on-state, default values relative to the HD layer 102 are set as initial values in the system controller 11.

Then at step SP22, a decision is made as to whether the play key 24 has been pressed or not. If the result of this decision signifies no pressing of the play key 24, a decision is made at step SP23 as to whether the CD/HD layer select key 23 has been pressed or not.

If the result of the decision at step SP23 is affirmative to signify pressing of the CD/HD layer select key 23, default values relative to the CD layer 101 are set at step SP24 as initial values in the system controller 11.

In this case, a state with no pressing of the play key 24 and pressing of the CD/HD layer select key 23 is judged to be a demand for reproduction of the CD layer 101, and the system controller 11 enables execution of reproducing the CD layer (or CD) at step SP25 and further indicates "CD" (turns on or blinks the CD element) in the display unit 13 at step SP26.

Subsequently at step SP27, a decision is made again as to whether the CD/HD layer select key 23 has been pressed or not during the reproduction.

And if the result of this decision signifies no pressing of the CD/HD layer select key 23 during the reproduction, the CD layer 101 is continuously reproduced at step SP31 until detection of a manipulation of the stop key 27 (or until completion of the reproduction).

Meanwhile, in case the result of the decision at step SP27 signifies pressing of the CD/HD layer select key 23 during reproduction of the CD layer 101, the operation proceeds to step SP28 to control the layer switching. Thereafter, the selected layer begins to be reproduced at step SP29, and the indication on the display unit 13 is also switched at step SP30. That is, since the HD layer 102 is to be reproduced in this case, "HD" is indicated (by turning on or blinking the HD element) in the display unit 13.

Subsequently, a decision is made at step SP31 as to whether the stop key 27 has been manipulated or not. And if the result of this decision signifies no manipulation of the stop key 27, the operation returns to step SP27 again, where a decision is made as to whether the CD/HD layer select key 23 has been pressed or not during the reproduction.

In case the result of this decision signifies that the CD/HD layer select key 23 has been pressed again, the layer to be reproduced is switched again through the processes at steps SP28 to SP30, and the indication on the display unit is also switched.

Meanwhile, if the result of the decision at step SP31 signifies manipulation of the stop key 27 during reproduction of the HD layer 102 or that of the CD layer 101 (or if the result signifies completion of reproducing the relevant layer), a process of stopping the reproduction is executed at step SP32, and then the entire operation is terminated at step SP33.

In case the result of the decision at step SP22 signifies pressing of the play key 24, the HD layer 102 begins to be reproduced at step SP34 while the initial values (corresponding to HD) set at step SP21 are kept unchanged. And "HD" is indicated on the display unit at step SP35.

Thereafter the operation proceeds to step SP27 and so forth, where reproduction of the HD layer 102 is performed, and the layer to be reproduced and the indication are switched in response to pressing of the CD/HD layer select key 23.

In this flowchart, pressing of the play key 24 or the CD/HD layer select key 23 is triggered by a start of reproduction, as in the foregoing flowchart of FIG. 4. However, the processing routine may be so modified as to start reproduction in response to insertion of the disc 1 even if none of such keys is manipulated. In this case, as represented by a broken line in FIG. 5, the operation proceeds to step SP34 if the result of the decision at step SP23 is negative, and then the HD layer 102 is reproduced preferentially with "HD" indicated on the display unit 13 at step SP35.

According to the second operation example mentioned above, initial setting is so executed that, when a multi-layer disc is loaded, first its HD layer 102 is reproduced preferentially. Therefore, in case the purpose is to reproduce the HD layer, fast reproduction thereof can be performed properly.

And when it is desired to switch the layer as in the case of reproducing the CD layer, the desired layer can be selected if the user presses the CD/HD layer select key 23 to switch the layer.

Thus, the second operation example is suitable particularly for any user who wants to enjoy reproduction of the high-quality HD layer principally.

Although the present invention has been described hereinabove with reference to the preferred embodiments, it is to be noted that the invention is not limited thereto alone, and a variety of other modifications and ranges of application may be contrived.

For example, the aforementioned embodiment represents an example where a 16-bit digital audio signal processed at a sampling frequency of 44.1 kHz is recorded in one layer of a dual-layer disc, while a 1-bit digital audio signal processed at a sampling frequency of 2.842 MHz through ΣΔ modulation is recorded in the other layer. However, the above may be so modified that, for example, a 16-bit digital audio signal processed at a sampling frequency of 44.1 kHz is recorded in one layer of the dual-layer disc, while an m-bit (where m=greater than 17) digital audio signal quantized at a sampling frequency of 48×n kHz (where n=integer greater than 2) is recorded in the other layer.

The number of layers is not limited merely to two alone, and another modification may be so contrived as to employ a multi-layer disc having three or more layers, wherein digital audio signals processed at different sampling frequencies with different numbers of quantization bits are recorded in such multiple layers.

According to the present invention, as described above, one layer is selected and reproduced in an initial state of the apparatus for a multi-layer disc, and still reproduction of the other layer can be performed in compliance with the user's preference or other reason or situation. That is, the priority order in reproduction of recorded layers is determined previously in the reproducing apparatus. Consequently, the user is enabled to reproduce either desired layer without the necessity of any particular manipulation.

Further, satisfactory reproduction complying with the user's preference or other situation can be realized by selecting the desired layer in response to the user's instruction which is outputted by manipulating the layer switching means.

In addition, since the selected layer to be reproduced is indicated on the display means, there is attained another advantageous effect that the layer being currently reproduced is recognizable without any manipulation by the user.

Further, since it is not necessary to record any particular information for discrimination between a CD layer and an HD layer on a multi-layer disc, superior compatibility is achievable with the conventional CD.

What is claimed is:

1. A multi-layer disc reproducing apparatus adapted to reproduce a multi-layer disc which has a first layer containing a recorded multi-bit digital signal quantized at a first sampling frequency and a second layer containing a recorded 1-bit digital signal quantized at a second sampling frequency higher than said first sampling frequency, said apparatus comprising:

layer switching means executing an instruction to selectively switch a signal reproduction of the first layer and a signal reproduction of the second layer; and reproduction control means for preferentially setting the signal reproduction to one of the first and second layers when the multi-layer disc is loaded in the reproducing apparatus, and switching the layer of reproduction in response to a manipulation of said layer switching means.

2. The multi-layer disc reproducing apparatus according to claim 1, wherein said signals in said first and second layers of said multi-layer disk are obtained from the same sound source.

3. The multi-layer disc reproducing apparatus according to claim 1, further comprising display means to discriminably indicate the layer selected by a manipulation of said layer switching means.

4. A multi-layer disc reproducing method adapted to reproduce a multi-layer disc which has a first layer containing a recorded multi-bit digital signal quantized at a first sampling frequency and a second layer containing a recorded 1-bit digital signal quantized at a second sampling frequency higher than said first sampling frequency, said method comprising the steps of:

setting an initial preference to reproduce one of said first and second layers of the multi-layer disc when the multi-layer disc is loaded in the reproducing apparatus; and updating said initial preference in such a manner as to execute signal reproduction from the other of said first and second layers in response to a manipulation of switching means.

* * * * *